United States Patent
Son et al.

(10) Patent No.: US 7,717,668 B2
(45) Date of Patent: May 18, 2010

(54) GAS TURBINE ENGINE SIMULATOR

(75) Inventors: Changmin Son, Derby (GB); Peter Ireland, Oxford (GB); Steven Thorpe, Leicestershire (GB); Terence Jones, Oxford (GB)

(73) Assignee: Rolls-Royce plc, London (GB)

( * ) Notice: Subject to any disclaimer, the term of this patent is extended or adjusted under 35 U.S.C. 154(b) by 835 days.

(21) Appl. No.: 11/583,068

(22) Filed: Oct. 19, 2006

(65) Prior Publication Data

US 2007/0207039 A1 Sep. 6, 2007

(30) Foreign Application Priority Data

Oct. 19, 2005 (GB) ................................. 0521215.4

(51) Int. Cl.
*F01D 25/00* (2006.01)

(52) U.S. Cl. ....................... 415/118; 416/61; 416/146 R

(58) Field of Classification Search ................. 415/115, 415/118; 416/61, 95, 146 R
See application file for complete search history.

(56) References Cited

U.S. PATENT DOCUMENTS

| | | | |
|---|---|---|---|
| 2,929,755 A | 3/1960 | Porter | |
| 3,611,601 A * | 10/1971 | Stropkay et al. | 40/587 |
| 3,695,778 A | 10/1972 | Taylor | |
| 5,080,496 A | 1/1992 | Keim et al. | |
| 5,471,967 A * | 12/1995 | Matsuzaki et al. | 124/6 |
| 5,544,873 A | 8/1996 | Vickers et al. | |
| 5,611,322 A * | 3/1997 | Matsuzaki et al. | 124/6 |
| 5,996,564 A * | 12/1999 | Kotowski | 124/6 |
| 6,901,810 B1 | 6/2005 | Harrold | |
| 7,004,813 B2 * | 2/2006 | Zuloff | 446/175 |
| 7,108,576 B2 * | 9/2006 | LaPointe | 446/47 |
| 2004/0057830 A1 * | 3/2004 | Boatner | 416/61 |
| 2005/0227580 A1 * | 10/2005 | Zuloff | 446/473 |

OTHER PUBLICATIONS

In Touch, vol. 1, No. 2, Published May 1991 and available at http://www.pfa.org/intouch/new_pdf/lr_IntouchV1.2.pdf.*

* cited by examiner

*Primary Examiner*—Edward Look
*Assistant Examiner*—Aaron R Eastman
(74) *Attorney, Agent, or Firm*—Oliff & Berridge, PLC

(57) ABSTRACT

A gas turbine engine simulator comprising a simulator rotor disc which has substantially the same maximum external dimensions as a rotor disc and is manufactured from a material which has a density of less than 220 kg/m$^3$. The simulator rotor disc is manufactured from a foamed plastic material with a closed cell structure. The simulator rotor disc is provided with a cavity in flow communication with a source of simulator coolant fluid, at least one flow outlet, at least one heater unit and at least one thermocouple mounted within said cavity for the measurement of simulator coolant fluid temperature within said cavity.

14 Claims, 4 Drawing Sheets

GAS TURBINE ENGINE SIMULATOR

The invention concerns a gas turbine engine simulator.

In particular it relates to a gas turbine engine simulator which includes a simulator rotor disc.

The development of machinery with components which, in operation, rotate at high speeds frequently requires the use of test equipment to validate an engineering design. For example in the case of a compressor or turbine rotor disc for a gas turbine engine it may be required to simulate operational heat transfer rates at different locations on and within the disc. These can be measured using a scale model and correcting the results obtained to allow for physical differences between the model and the actual disc. Alternatively an instrumented compressor or turbine rotor disc can be employed, but this will require adequate containment to prevent harm to equipment and personnel in case the disc should fail. High speed rotating rotor discs can cause severe damage if they fail, and so experiment rigs are usually installed in heavily shielded rooms or pits. Alternatively compressor or turbine rotor discs can be instrumented and run at a rotational speed significantly lower than operational speeds to obviate the need for containment, but the results obtained will need correcting to scale them to operational conditions. Such scaling calculations inherently introduce errors into the derived results.

According to the present invention there is provided a gas turbine engine simulator comprising a simulator rotor disc which has substantially the same maximum external dimensions as a rotor disc and is manufactured from a material which has a density of less than 220 kg/m$^3$.

The present invention overcomes problems with the prior art by providing a simulator which more closely mimics the operation of a rotor disc whilst avoiding the need for substantial disc failure containment measures. By manufacturing the rotor disc from a material of low density to produce a simulator rotor disc having a mass significantly lower than that of the rotor disc being simulated, the inertia and stresses of the simulated disc will be low and hence disc failure containment measures need only be minimal. Typically a rotor disc for a gas turbine engine has a density of about 9,000 kg/m$^3$, resulting in a mass of about 80 kg. Hence a simulator disc having a significantly lower density will have a significantly lower mass, and will be much safer to work with. In addition, the forces generated by lack of balance of the rotating disk are similarly reduced by the use of a low mass disc, hence a simulator rotor disc according to the present invention is easier to balance, mount and operate than a rotor disc. By making the simulator rotor disc to substantially the same size and geometry as the rotor disc being simulated aerodynamic differences between the simulated and operational conditions are minimised.

Preferably the simulator rotor disc substantially comprises a plastic material. Plastic is generally of considerably lower density than metal and has high resistance to stress.

Preferably the simulator rotor disc comprises a foamed plastic material. Foaming a material further reduces it density, hence a simulator of a given size made from a foamed plastic will be lighter than a simulator rotor disc made from a solid plastic.

Preferably the foamed plastic material is provided as a closed cell structure. A closed cell structure is more robust than an open cell structure since it contains less flaws and failure initiation points, thereby increasing its resistance to failure when rotated at high speeds.

Preferably the simulator rotor disc is provided with a cavity in flow communication with a source of simulator coolant fluid, at least one flow outlet, at least one heater unit and at least one thermocouple mounted within said cavity for the measurement of simulator coolant fluid temperature within said cavity. This enables the measurement of heat transfer characteristics of a turbine disc at a given location. In particular it allows for estimation of the heat transfer between a rotor disc and coolant air and heat transfer between rotor blades and coolant air in the region where they are attached to the rotor disc.

Preferably the simulator coolant fluid is chosen from a group comprising carbon dioxide and argon. The simulator coolant fluid can be any fluid which has a density at rig operating conditions (ie substantially ambient atmospheric temperature and pressure) such that flow fields of an operational engine can be reproduced.

Preferably the simulator has a maximum rotational speed in the range of about 3,000 revolutions per minute to about 10,000 revolutions per minute. That is to say, the simulator rotor can be rotated at speeds substantially the same as the rotor.

The present invention will now be described, by way of example only, with reference to the accompanying figures in which.

Figure 1:
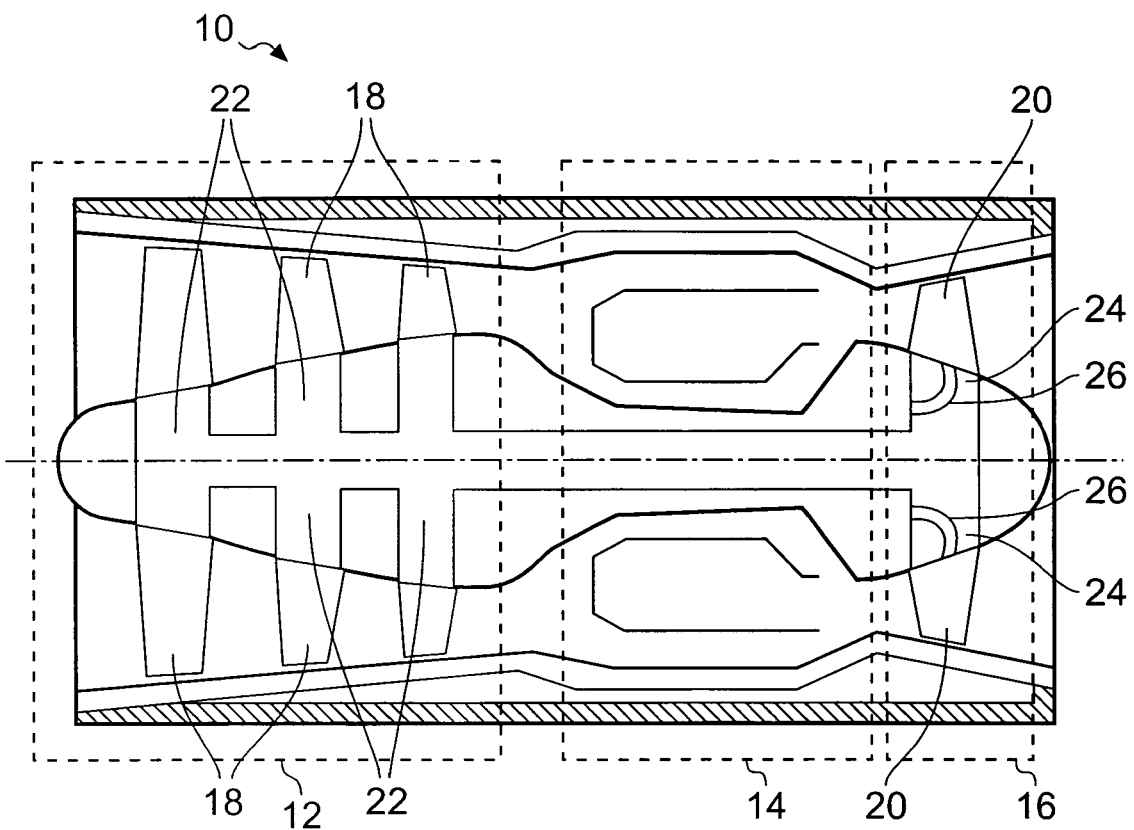
FIG. 1 shows a diagrammatic representation of a gas turbine engine (PRIOR ART)

A diagrammatic representation of a typical gas turbine engine 10 is presented in FIG. 1 (PRIOR ART). The engine 10 comprises a compressor section 12, a combustion section 14 and a turbine section 16. The compressor 12 and turbine 14 contain rotor blades 18,20 attached to rotor discs 22,24. Typically air is fed through the turbine rotor disc 24 to the rotor blade 20 through passages 26 to cool the rotor disc 24 and rotor blades 26.

Figure 2:
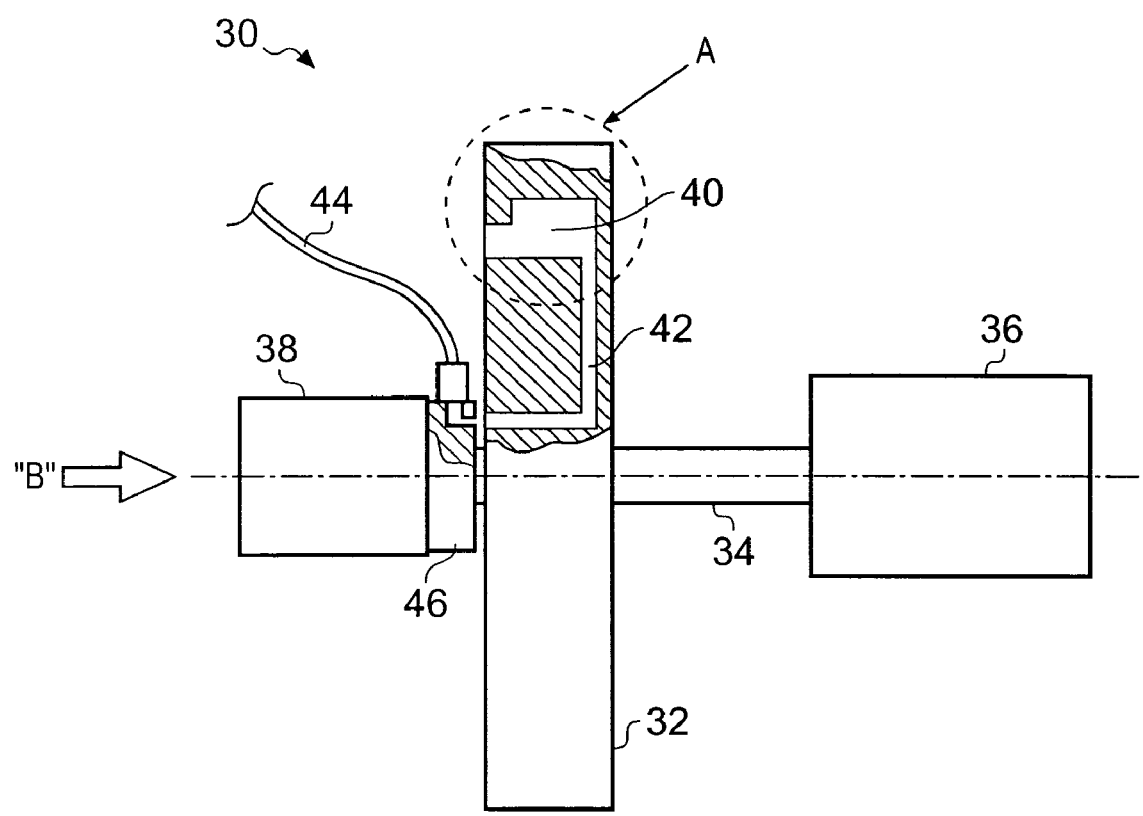
FIG. 2 shows a side view of a gas turbine simulator according to the present invention.

Shown in FIG. 2 is a gas turbine engine simulator 30 according to the present invention. The specific embodiment shown is a simulator configuration for the simulation of gas turbine engine rotor discs. The simulator 30 comprises a simulator rotor disc 32 mounted on a shaft 34 which extends through the disc 32. The shaft 34 is driven by a motor 36 at one end and supported by a bearing 38 at the other end. The simulator rotor disc 32 is provided with a cavity 40 at a position radially outward of the rotational axis of the disc 32. A passage 42 provides flow communication between the cavity 40 and a source of simulator coolant fluid, indicated diagrammatically by a pipeline 44 which ducts coolant flow by some suitable means from a non rotatable collar 46 provided around the shaft 34, to an inlet end of the passage 42. The means by which flow is communicated from the collar 46 to the inlet end of the passage 42 will not be described in detail here and is not central to understanding the present invention.

The simulator rotor disc 32 has substantially the same maximum external dimensions as the rotor disc 22,24 in the engine 10 being simulated. Unlike an engine rotor disc, the simulator rotor disc 32 is manufactured from a material which has a density of less than 220 kg m$^3$. Preferably the rotor 32 is made from material which has a density in the range of 20 kg/m$^3$ to 220 kg/m$^3$. Typically the rotor 32 is made from a material which has a density of about 110 kg/m$^3$. In the present example the simulator rotor disc is primarily made from a foamed plastic material to optimise density, although it may also be made from a solid plastic material. The foamed plastic material has a closed cell structure.

Figure 3:
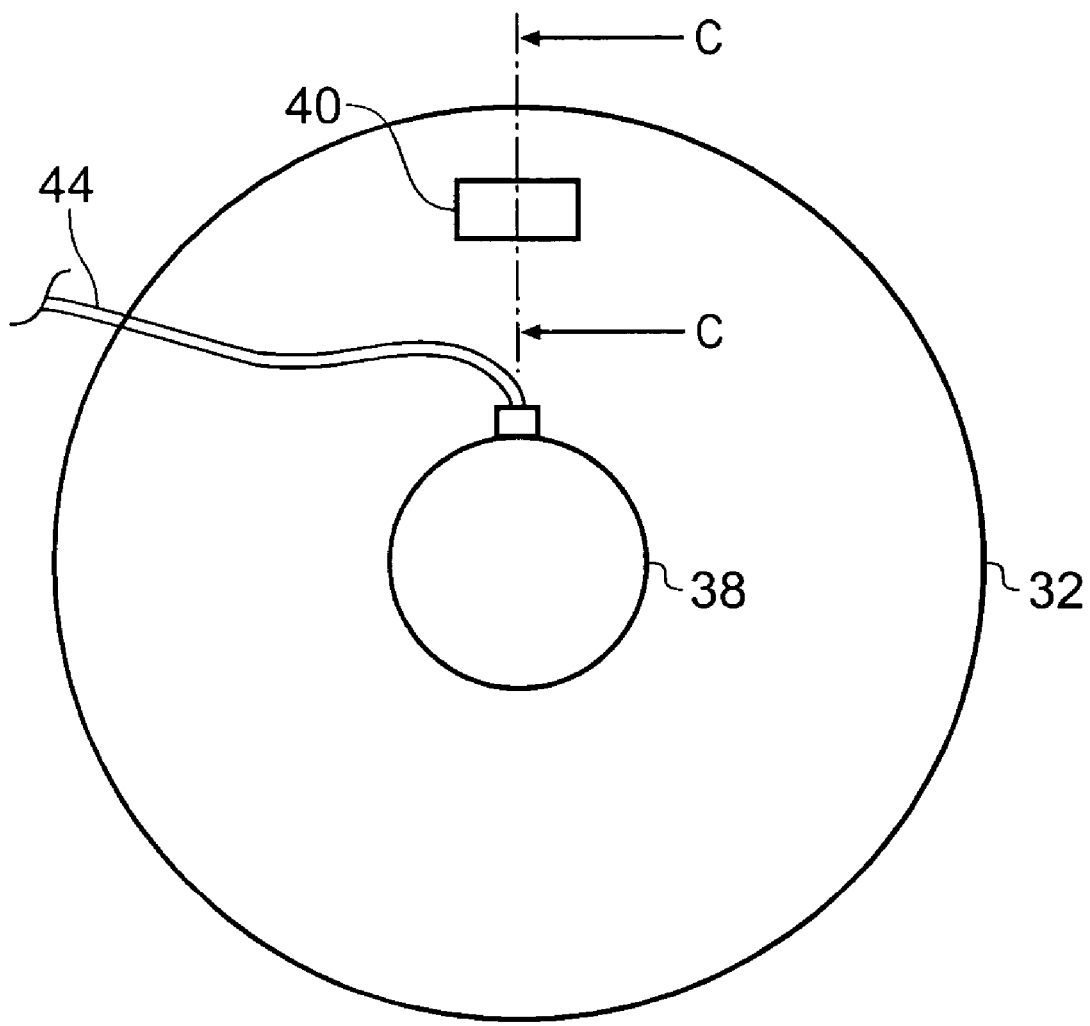
FIG. 3 shows an end view of the simulator as seen from direction indicated by arrow B in FIG. 2.

As shown in FIG. 3, in this embodiment the cavity 40 is of rectangular form provided at a single location radially outward of the axis of rotation of the simulator 32.

Figure 4:
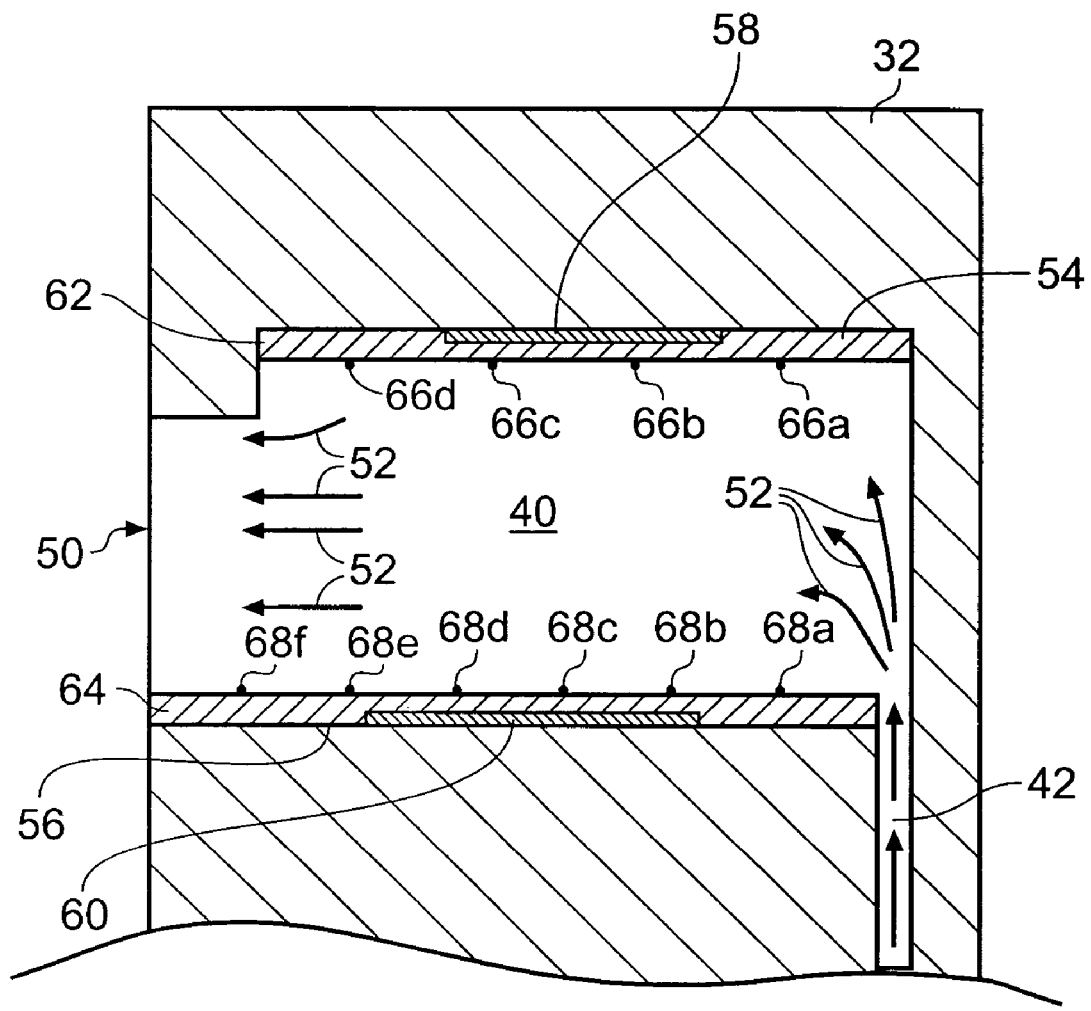
FIG. 4 shows an enlarged view of the section A circled in FIG. 2, and the cross-sectional view C-C indicated in FIG. 3.

An enlarged view of the region of the simulator 32 in which the cavity 40 is provided, as indicated by the dotted circle "A" in FIG. 2 and as viewed at the cross-section location C-C in FIG. 3, is presented in FIG. 4. The passage 42 provides flow communication between cavity 40 and a source of simulator coolant fluid, and a flow outlet 50 permits simulator coolant flow delivered by the passage 42 to be exhausted from the cavity 40, as shown by arrows 52. The cavity 40 is provided as a rectangular chamber having a roof 54 radially outward of a floor 56. Heater units 58,60 are provided in the roof 54 and floor 56 respectively. Thermally conductive plates 62,64 are fixed over the top of the heater units 58,60 respectively. Thermocouples 66a-e, 68a-f are mounted on the thermally conductive plates 62,64 respectively, spacing the heater units 58,60 apart from the thermocouples 66a-e, 68a-f. The means by which power is supplied to operate the heater units 58,60 or the means by which outputs are received from the thermocouple 66a-e, 68a-f is by some suitable means not discussed here and which is not central to the understanding of the invention.

In operation the motor 36 drives the simulator rotor 32 at a variety of rotational speeds. One of the advantages of the present invention is that because of the low weight of the simulator rotor 32, the rotor 30 can be driven at rotational speeds substantially the same as the operational rotational speeds of the rotors 22,24 in the engine without becoming hazardous. A simulator rotor 32 the size of a typical rotor disc 22,24 for a gas turbine engine has sufficient structural integrity to withstand centrifugal forces without failing at speed in the range of about 3000 revolutions per minute to about 10,000 revolutions per minute. Preferably the simulated rotor has a maximum rotational speed of about 7000 revolutions per minute.

Hence the ratio of maximum rotational disc speed to maximum simulator rotational speed is not less than 1 but no greater than about 4. The maximum rotational speed achievable before the simulator disc 32 may fail is hence in the range of speeds up to the speed of a rotor 22,24 but not less than a quarter of the maximum rotational speed of the rotor 22,24. Experiments to date have shown a ratio of maximum rotor 22,24 rotational disc speed to maximum simulator 32 rotational speed of about 1.6 is achievable without risking failure of the simulator disc 32.

The embodiment presented in FIGS. 2 to 4 relates specifically to a simulator 32 for measuring heat transfer rates between coolant air at junction between a rotor disc 22,24 and the rotor blades 18,20. In operation (when the simulator 32 is rotating) simulator coolant fluid is supplied to the cavity 40 via the passage 42. Heater units 58,60 raise the temperature of the thermally conductive plates 62,64 and the temperature is measured by thermocouples 60a-d and 68a-f. Heat will be transferred between the simulator coolant flow 52 passing over the thermocouples 66,68 and thermally conductive plates 62,64 causing a change in temperature along the thermally conductive plates 62,64, which is recorded by the thermocouples 66,68. The simulation is conducted at any desired rotor speed, acceleration or deceleration.

The simulator gas fed into the cavity 40 via passage 42 is chosen from a group of fluids which has a density at rig operating conditions (ie substantially ambient atmospheric temperature and pressure) such that flow fields of an operational engine can be reproduced. Experiments have shown that carbon dioxide and argon are suitable for use as a simulator coolant fluid.

The advantage of such a simulator is that details of operational characteristics of rotor discs can be determined cheaply and quickly (ie without having to use original engine parts or provide containment for a metal rotor disc). Additionally there will be fewer errors in the derived results because the data is recorded from a component of similar size and running at similar speeds and hence require only minor correction and/or normalisation.

Further advantages of using a plastic rotor disc 32 over a metal rotor disc 22,24 are that the plastic disc is safer to work with, and is considerably quicker and easier to balance than a metal disc. Additionally metal discs are subject to significant thermal conduction hence will affect the accuracy of the recorded heat transfer data, a problem which is exaggerated by running the simulation at close to ambient conditions rather than at engine running temperatures. That is to say heat loss from a metal simulator at low temperatures will cause large errors, but heat loss from a plastic rotor disc will be minor. Additionally the spatial resolution of the results taken from a metal disc will be less than that for a plastic disc because of heat conduction away from the heater unit through the disc material. That is to say, thermal conduction in directions parallel to the surface will effect the thermocouple readings, thereby reducing accuracy of the recorded temperature at a given location.

The present invention could be easily modified to measure cooling of any rotatable component including rotor blades. Additionally it could be employed to calibrate instrumentation for rotatable components where it is required to calibrate the instrumentation under controlled conditions.

The invention claimed is:

1. A gas turbine engine simulator comprising: a simulator rotor disc which has substantially the same maximum external dimensions as a rotor disc and is manufactured from a material which has a density of less than 220 kg/m3, wherein the simulator rotor is provided with at least one thermocouple mounted within a cavity for the measurement of a simulator coolant fluid temperature within said cavity.

2. A simulator as claimed in claim 1 wherein the simulator rotor disc is manufactured from a material which has a density in the range of about 20 kg/m3 to about 220 kg/m3.

3. A simulator as claimed in claim 1 wherein the simulator rotor disc is manufactured from a material which has a density of about 110 kg/m3.

4. A simulator as claimed in claim 1 wherein the simulator rotor disc substantially comprises a plastic material.

5. A simulator as claimed in claim 4 wherein the simulator rotor disc comprises a foamed plastic material.

6. A simulator as claimed in claim 5 wherein the foamed plastic material is provided as a closed cell structure.

7. A simulator as claimed in claim 1 wherein the simulator rotor disc is provided with said cavity in flow communication with a source of simulator coolant fluid, at least one flow outlet and at least one heater unit.

8. A simulator as claimed in claim 7 wherein the at least one heater unit and the at least one thermocouple are spaced apart from one another by a thermally conductive plate provided within said cavity.

9. A simulator as claimed in claim 7 wherein the at least one heater unit is mounted on the roof and/or the floor of the cavity, the at least one thermocouple is mounted on the thermally conductive plate and spaced apart from the heater unit by the thermally conductive plate.

10. A simulator as claimed in claim 7 wherein the simulator coolant fluid is chosen from a group comprising carbon dioxide and argon.

11. A simulator as claimed in claim 1 wherein the simulator rotor has a maximum rotational speed in the range of about 3,000 revolutions per minute to about 10,000 revolutions per minute.

12. A simulator as claimed in claim 1 wherein the simulated rotor has a maximum rotational speed of about 7,000 revolutions per minute.

13. A simulator as claimed in claim 1 wherein a ratio of maximum rotational speed of the rotor disc to maximum rotational speed of the simulator rotor disc is no less than about 1 but no greater than about 4.

14. A simulator as claimed in claim 13 wherein the ratio of maximum rotor rotational disc speed to maximum simulator rotational speed is about 1.6.

\* \* \* \* \*